United States Patent [19]

Haake et al.

[11] 3,708,176

[45] Jan. 2, 1973

[54] CASSETTE TRAY CONTROL MECHANISM

[75] Inventors: Robert Haake, Pasadena, Calif. 91107; Joseph J. Ponzi, Alhambra, Calif. 91803

[73] Assignee: Bell and Howell Company, Chicago, Ill.

[22] Filed: June 29, 1970

[21] Appl. No.: 50,406

[52] U.S. Cl. ....................................274/4 F, 353/116

[51] Int. Cl. ..............................................G11b 23/12

[58] Field of Search ..............40/79; 353/116, 15, 19; 274/4 F

[56] References Cited

UNITED STATES PATENTS

| | | | |
|---|---|---|---|
| 3,067,535 | 12/1962 | Mulch | 40/79 |
| 3,332,319 | 7/1967 | Gerry | 274/4 F |
| 3,359,665 | 12/1967 | Gerry | 274/4 F |
| 3,353,443 | 11/1967 | Hall | 353/15 |
| 564,466 | 6/1896 | Briggs et al. | 40/79 |

*Primary Examiner*—William D. Martin, Jr.
*Assistant Examiner*—Dennis A. Dearing
*Attorney*—William F. Pinsak, John E. Peele, Jr., Kenneth W. Greb and William K. Serp

[57] ABSTRACT

A cassette tray control mechanism operable to automatically and sequentially place cassettes in a position for loading a tape recorder-reproducer for playing a plurality of cassettes and operable to automatically return the tray for replaying the cassette thereby providing continuous reproduction.

5 Claims, 4 Drawing Figures

Inventors:
Robert Haake,
Joseph J. Ponzi.
By Kenneth [illegible] Agent
William [illegible] Atty Inventors:
Robert Haake,
Joseph J. Ponzi.
By Kenneth [signature] Agent.
William [signature] Atty

CASSETTE TRAY CONTROL MECHANISM

The present invention relates to tape recorder-reproducers or the like, and, more particularly, to a mechanism operable to automatically advance a tray supporting a plurality of tape cassettes for successive reproduction and operable to automatically return the tray to repeat the successive reproduction operation thereby providing unlimited continuous reproduction.

Known information reproduction machines of the type having a tray carrying a plurality of information carrying media such as cassette tapes, cartridged films or slide pictures automatically and sequentially advance the tray in one direction for successive reproduction. A disadvantage of this type of tray control is the information carried by the tray will be produced only once, thereby resulting in limited successive reproduction. When it is desirous for continuous reproduction, the tray is either manually returned to an initial position for repeating the successive reproduction operation or the tray is removed from the machine and another tray inserted for successive reproduction. The disadvantage of this method of providing continuous reproduction is that the machine would necessarily have to be repeatedly re-loaded.

It is an object of the present invention to provide a tape recorder-reproducer with a cassette tray control mechanism operable to provide unlimited continuous reproduction.

It is another object of the present invention to provide a tape recorder-reproducer with a cassette tray control mechanism having an automatic tray indexing means for sequentially advancing the tray to provide successive reproduction and having an automatic tray return means for permitting recycling of the indexing means to provide unlimited continuous reproduction.

Further and other objects of this invention will be readily understood by those skilled in the art with reference to the following description of the accompanying drawings.

Figure 1:
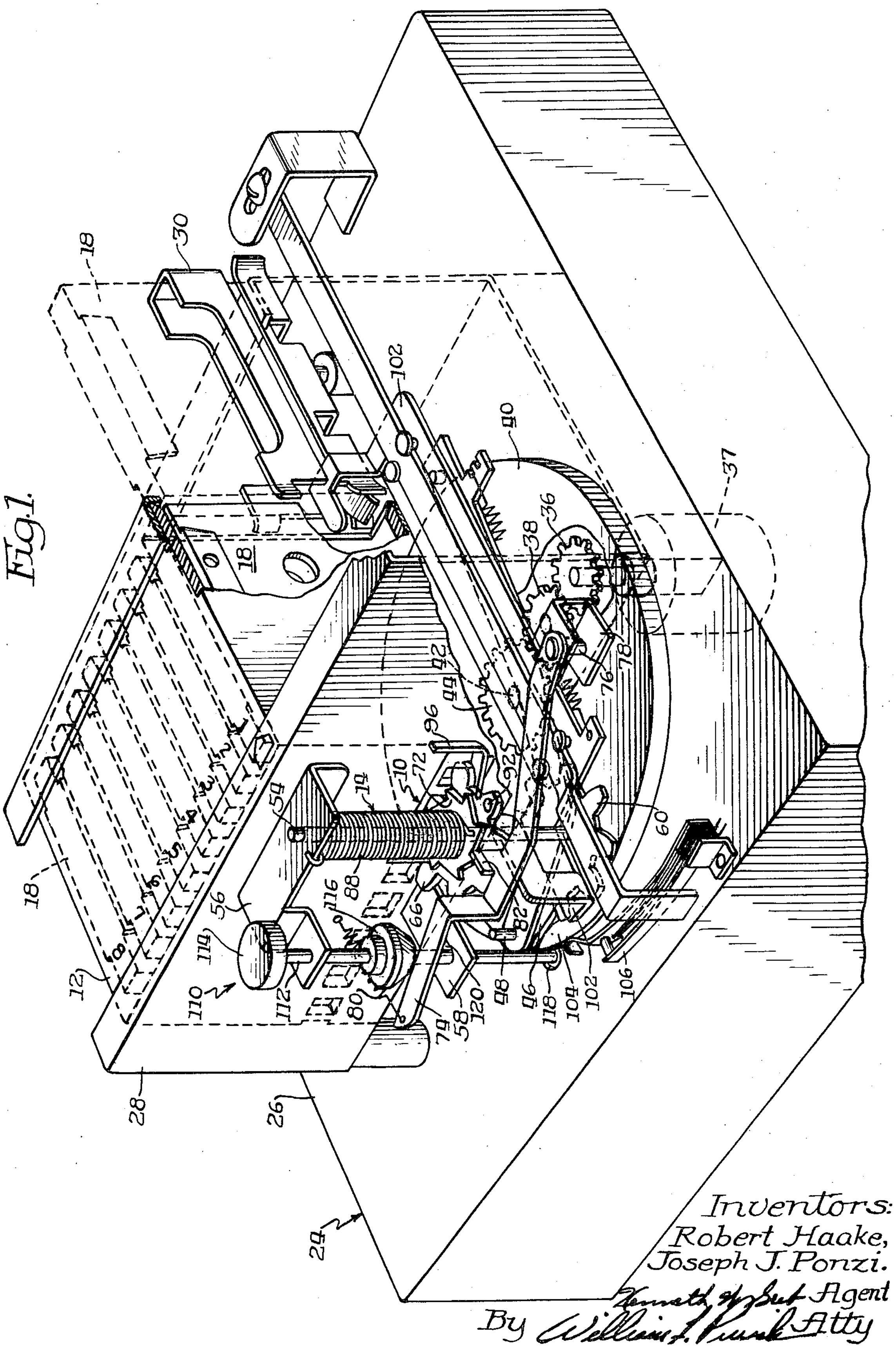
FIG. 1 is a rear perspective view showing the cassette tray control mechanism in an initial position to locate the first cassette for reproduction.
Figure 3:
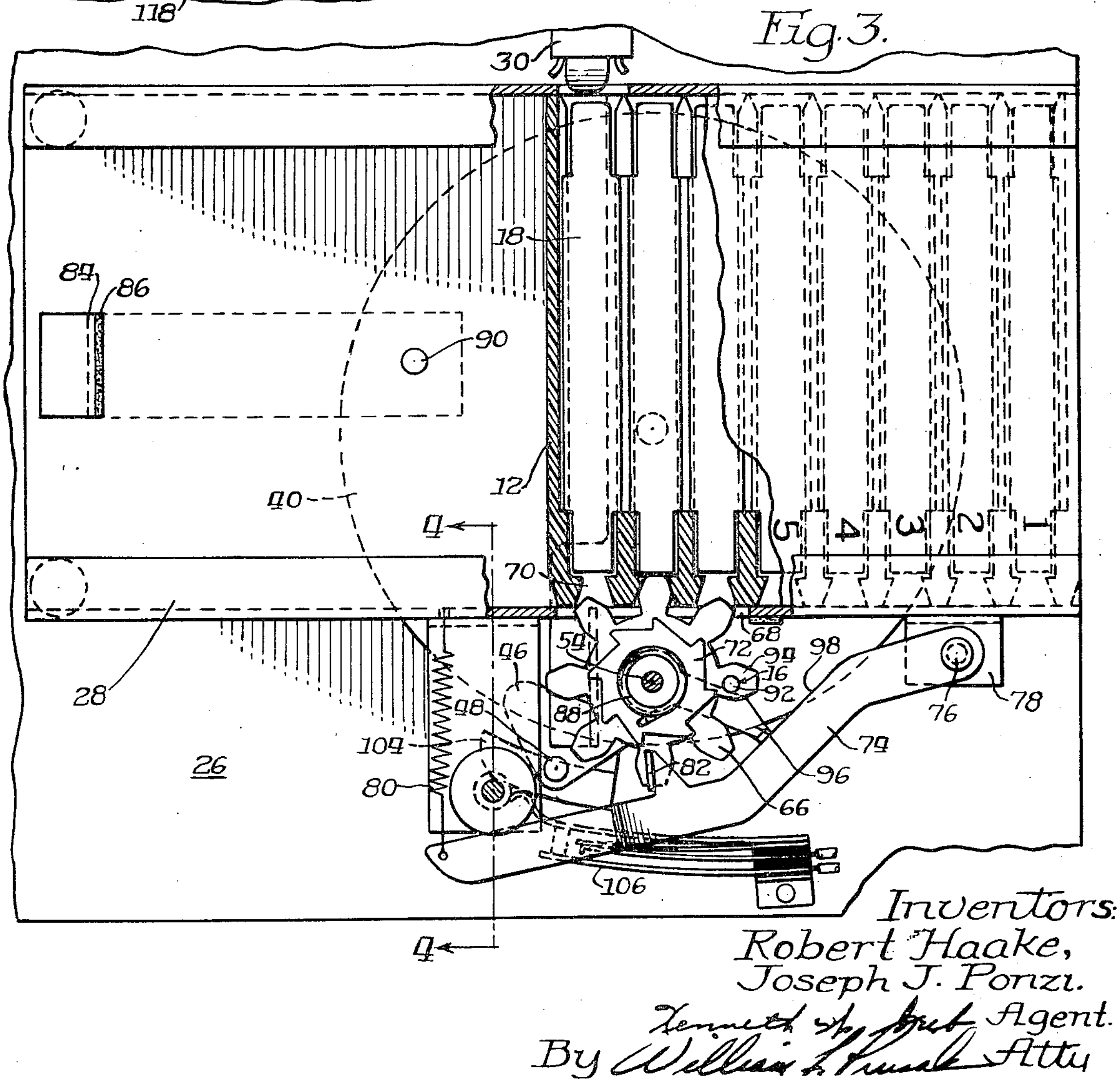
FIG. 3 is a partial plan view showing the indexing means released to permit automatic return of the tray.

The basic operation of the cassette tray control mechanism will be summarized. Referring to FIGS. 1 and 3, an indexing means 10 is operable to incrementally move a tray 12 from the initial position shown in FIG. 1 to an end position as shown in FIG. 3. A power means 14 is connected to the indexing means 10 and is operable to return the tray 12 from the position as shown in FIG. 3 to the position as shown in FIG. 1. A signal means 16, FIG. 3, is carried by the indexing means 10 and is operable to release the indexing means 10 after a last cassette 18 in the tray 12 has been returned to the tray 12, which is after reproduction, to permit the power means 14 to return the tray 12 to the initial position.

The tape recorder-reproducer 24 has a main frame 26 and a U-shaped guide member 28 for guiding the tray 12 carrying a plurality of cassettes 18. A cassette carrier 30 is located to receive a cassette 18 from each incremental position of the tray 12. The carrier 30 is operable to place the cassette 18 in a record-reproduce position for playing from one track and is operable to invert the cassette 18 for playing a second track. The carrier 30 is further operable to invert that cassette 18 to its original orientation before the cassette 18 is returned to the tray 12.

Referring to FIG. 1, a driving gear 36 is rotated clockwise by a motor 37. An idler gear 38 is rotated counterclockwise by the driving gear 36. A gear member 40 rotatable about a shaft 42 has an integral driven gear 44 in mesh with the idler gear 38. A pin support 46 is rigidly assembled on the periphery of the gear member 40. An indexing pin 48 extends upward from the pin support 46.

Figure 2:
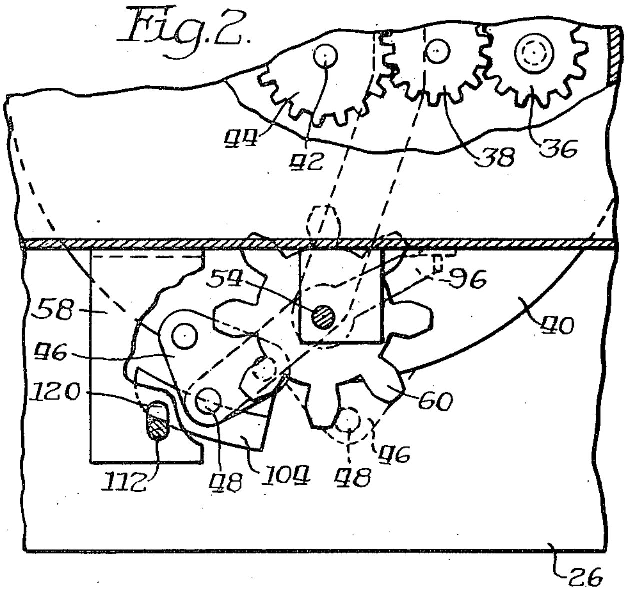
FIG. 2 is an enlarged partial plan view taken from FIG. 1 showing the indexing means just prior to the indexing operation.

A shaft 54 is vertically supported on the guide member 28 by an upper bracket 56 and by a lower bracket 58. A first toothed member 60 is rigidly assembled at the lower end of the shaft 54. Referring to FIG. 2, the teeth of the first toothed member 60 are located in the path of the indexing pin 48. As the gear member 40 is rotated clockwise, the indexing pin 48 engages one tooth of the first toothed member 60 and drives the toothed member 60 one tooth space clockwise about the axis of the shaft 54.

A second toothed member 66, FIG. 3, is rigidly assembled to the shaft 54 midway of the length of the length of the shaft 54. The teeth of the second toothed member 66 extend into an opening 68 in the U-shaped guide member 28 and further extend into toothed shaped openings 70 in the tray 12. One toothed space movement of the first toothed member 60 advances the second toothed member 66 the same one toothed space which incrementally moves the tray 12 one space to place the succeeding cassette 18 in the location for alignment with the carrier 30. A ratchet 72 is rigidly assembled on the shaft 54 adjacent the second toothed member 66. A pawl member 74 is pivotally mounted at one end on the guide member 28 by a pin 76 extending through a U-shaped bracket 78. A spring 80 is connected at one end to the free end of the pawl member 74 and is connected at the other end to the guide member 28. A pawl 82 is formed upward from the pawl member 74 intermediate the free end and the pivot end thereof. The spring 80 constantly biases the pawl 82 in the path of the teeth of the ratchet 72.

The power means 14 for returning this tray 12 to the initial position is a torsion spring 88. The torsion spring 88 is assembled around the shaft 54 and has one end connected to the ratchet 72 and has the other end connected to the upper bracket 56. Each time the first toothed member 60 is advanced by the indexing pin 48, the shaft 54 advances the ratchet 72, which, in turn, adds tension to the torsion spring 88. The tension of the torsion spring 88 tends to rotate the ratchet 72 counterclockwise about the shaft 54. In this manner, the torsion spring 88 acts as a detent spring by constantly biasing the teeth of the ratchet 72 against the pawl 82.

It can now be seen that the indexing means 10 includes the driving gear 36 for incrementally advancing the tray 12 by each revolution of the gear member 40 and includes a ratchet 72 and a pawl member 74 for holding the tray 12 in each of a plurality of positions.

Referring now to FIGS. 1 and 3, the signal means 16 includes a signal pin 92 rigidly assembled on one of the teeth 94 of the second toothed member 66. When the tray 12 is in its initial position, the signal pin 92 is in the position as shown in FIG. 1. The second toothed member 66 carries the signal pin 92 about the axis of the shaft 54 until the tray 12 starts to advance past the last cassette position of the tray 12. During this movement, an arm 96 pivotally mounted on the shaft 54 is pivoted clockwise by the signal pin 92. The arm 96 engages an edge 98 of the pawl member 74 and pivots the pawl member 74 counterclockwise about the pin 76 until the pawl 82 disengages from a tooth of the ratchet 72. The arm 96 is now in a position to hold the pawl member 74 out of engagement from the ratchet 72 without being held by the signal pin 92. The torsion spring 88 is now free to rotate the second toothed member 66 counterclockwise which returns the tray 12 to the initial position. The initial position is determined by an abutment 84 projecting upward through the U-shaped guide member 28 in the path of the tray 12. The abutment 84 has a noise absorbing pad 86 adhered thereto to stop the tray 12 for aligning the first cassette 18 with the carrier 30. The abutment 84 extends along the underside of the guide member 28 and is rigidly assembled thereto by a rivet 90. The signal pin 92 rotates counterclockwise about the shaft 54 with the second toothed member 66 until the signal pin engages the arm 96 and pivots the arm 96 counterclockwise about the shaft 54 to disengage the arm 96 from the pawl member 74. The spring 80 now pivots the pawl member 74 clockwise about the pin 76 until the pawl 82 enters the path of the teeth of the ratchet 72.

The tape recorder-reproducer 24 has an electrical circuit (not shown) controlled by a manually operated two position switch (not shown) and by a machine operated circuit breaking switch 106. The two positions of the manual switch is single and continuous. When this switch is in the single position, the gear member 40 is rotated clockwise by the driving gear 36 in a manner to drive a loading-unloading member 102 to the right to move a cassette 18 from the tray 12 to the carrier 30, permit reproduction from each of two tracks of the tape, and to drive the loading-unloading member 102 to the left to move the cassette 18 from the carrier 30 to the tray 12. At this time, a cam 104 carried by the gear member 40 opens the circuit breaking switch 106 to de-energize the motor 37 that rotates the driving gear 36. This operation loads, reproduces, unloads a single cassette and stops the loading cycle.

When the switch is in the continuous position, the circuit breaking switch 106 becomes ineffective thereby permitting automatic repeated clockwise rotation of the gear member 40 as in the manner of the single operation. This automatic repeated operation provides the successive reproduction of each cassette 18 in the tray 12. After the end cassette has been reproduced, the torsion spring 88 returns the tray 12 to its initial position against the abutment 84 with sufficient speed to permit recycling the indexing means 10 without de-energizing the motor 37 for replaying each of the cassettes 18 in the tray 12. Therefore, this tray control mechanism is operable to provide unlimited, continuous reproduction.

Figure 4:
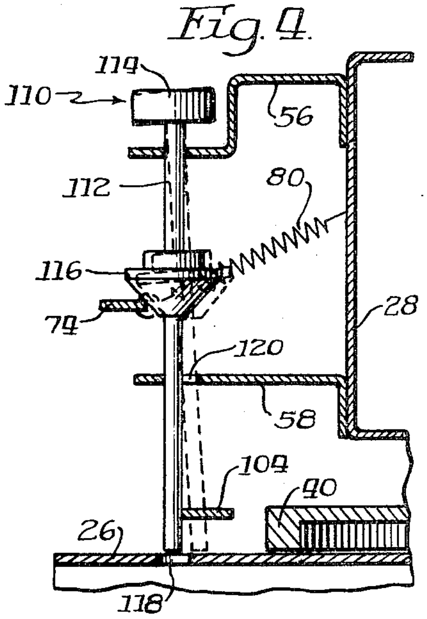
FIG. 4 is a partial right elevational view of a manually operable means to selectively release the indexing means to permit tray return.

Referring now to FIGS. 1 and 4, a manually operable means 110 is selectively operable to return the tray 12 to the initial position after the tray 12 has been indexed away from the initial position. A shaft 112 is vertically supported by the lower bracket 58 and the upper bracket 56. A knob 114 is rigidly assembled at the upper end of the shaft 112. A conical shaped cam 116 is rigidly assembled to the shaft 112 and is located adjacent to the pawl member 74.

The main frame 26 has an opening 118 in alignment with the lower end of the shaft 112. When the machine is in a normal non-operating condition, the cam 104 holds the shaft 112 in alignment with the opening 118. The spring 80 biases the free end of the pawl member 74 against the lower portion of the conical shaped cam 116. Depressing the knob 114 causes the cam 116 to pivot the pawl member 74 counterclockwise about the pivot pin 76 thereby moving the pawl 82 out of engagement from the ratchet 72. The torsion spring 88 is again free to return the tray 12 to the initial position of abutment 84. When the knob 114 is released, the spring 80 pulls on the pawl member 74 at such an angle as to drive the shaft 112 upward to its normal undepressed position. When the gear member 40 moves the cam 104 away from the lower end of the shaft 112, the tension from the spring 80 causes the pawl member 74 to move the lower end of the shaft 112 out of alignment from the opening 118 in the main frame 26. Under this condition, the knob 114 and shaft 112 cannot be depressed when the gear member 40 is in any other position other than a starting position as shown in FIG. 1. The upper bracket 56 acts as a pivot for the shaft 112 and the lower bracket 58 has a slot 120 to permit a swinging movement of the shaft 112. When the gear member 40 again moves the cam 104 to the initial position, the cam 104 pivots the shafts 112 into alignment with the opening 118.

What is claimed is:

1. A mechanism for moving a tray carrying a plurality of information carrying media for continuous reproduction of the information comprising:

indexing means for moving the tray from an initial position to advanced positions to locate each information carrying media proximate a play station, said indexing means includes a toothed member for moving the tray, means for intermittently actuating said toothed member for moving the tray to said advanced positions, a ratchet connected to said toothed member for movement therewith, and a pawl member operable to engage said ratchet;

a spring member connected to said indexing means for biasing said ratchet against said pawl member for holding the tray at each position, said spring member being tensioned by said indexing means upon each intermittent actuation of said toothed member to condition said spring member for returning the tray to the initial position, and signal means carried by said indexing means for releasing said pawl member from said ratchet thereby allowing said spring member to return the tray to the initial position to permit repeating said indexing means operation for continuous reproduction from the media.

2. A mechanism as in claim 1 wherein said ratchet is integrally formed with said toothed member.

3. A mechanism as in claim 1 further comprising manually operable means to release said pawl member from said ratchet thereby allowing said spring member to return the tray to the initial position.

4. A mechanism as in claim 1 wherein said signal means includes a first member for engaging said pawl member and a second member operable in one direction to move said first member against said pawl member for releasing said pawl member from said ratchet and operable in another direction to move said first member away from said pawl member to permit said pawl member to re-engage said ratchet.

5. A mechanism as in claim 1 wherein said toothed member actuating means includes a pin member operable to engage the teeth of said toothed member for intermittently actuating said toothed member.

* * * * *